United States Patent [19]

Holloway

[11] Patent Number: 5,036,655
[45] Date of Patent: Aug. 6, 1991

[54] REPLACEMENT ROLLER AND TURF GROOMER

[76] Inventor: E. Ray Holloway, 2647 Hallman St., Pontiac, Mich. 48054

[21] Appl. No.: 516,520

[22] Filed: Apr. 30, 1990

[51] Int. Cl.$^5$ .................... A01B 45/02; A01D 34/42
[52] U.S. Cl. ................. 56/256; 56/DIG. 6; 172/21
[58] Field of Search ............... 56/14.8, 193, 256, 201, 56/295, DIG. 6; 172/21, 15, 120, 122, 123, 125, 536, 540; 171/5

[56] References Cited

U.S. PATENT DOCUMENTS

| | | | |
|---|---|---|---|
| 2,478,587 | 8/1949 | LaBonte | 56/256 |
| 2,479,460 | 8/1949 | Becker | 56/256 |
| 3,739,856 | 6/1973 | Ray | 56/256 X |
| 4,685,280 | 8/1987 | Lloyd et al. | 56/256 |
| 4,724,662 | 2/1988 | Giandenoto | 172/21 X |
| 4,841,717 | 6/1989 | Lloyd | 56/256 |

FOREIGN PATENT DOCUMENTS 1454900  11/1976  United Kingdom .................. 172/21

Primary Examiner—Stephen J. Novosad
Attorney, Agent, or Firm—John J. Cantarella

[57] ABSTRACT

A lawn or turf aerating, dethatching, and grooming apparatus which derives the power needed to perform these functions from a movement of the apparatus against the lawn or turf surface that is desired to be affected by the apparatus. The apparatus is adaptable to a wide variety of lawn maintenance devices and particularly as a replacement front roller for a reel-type lawn mower.

7 Claims, 1 Drawing Sheet 5,036,655

REPLACEMENT ROLLER AND TURF GROOMER

BACKGROUND OF THE INVENTION

1. Field of the Invention

This invention relates to implements for grooming, aerating, and dethatching lawn or turf surfaces. More particularly, the present invention is a device intended to be connected to a reel-type lawn mower as a replacement for the original front roller, to perform the function of grooming, dethatching, trimming and aerating a lawn while simultaneously performing the normal function of the original front roller, that being to support the cutting head of the mower at a desired distance above the lawn surface.

2. Description of the Relevant Art

The benefits derived through aeration, dethatching, and grooming of lawn and turf surfaces are commonly known. Past and presently known aerators have relied upon a power source to perform their action. This need for a power source has complicated the structure of these devices and generally precluded their use with lawn maintenance equipment not originally designed for use with these known aerators. A further concern develops in the case of a groomer unit which is disposed between the cutting head and the front roller of a reel-type mower, the concern being that the aerator prevents the cutting head from accurately following the contour of the ground as it is distanced further away from the front roller which functions to determine how close to the ground surface the cutting head travels. This inaccuracy often results in scalping or other damage to the lawn surface and otherwise proves to render less than desirable results.

The present invention eliminates the problems associated with the prior known groomers as it requires no external power source to perform its functions, replaces the front roller on lawn mowers or similar devices thereby giving them additional practical utility, accuracy in cutting heights is maintained, and the device is adaptable to lawn maintenance equipment of various configurations and/or designs and supplies the support provided by the front roller on conventional known reel-type lawn mowers.

SUMMARY OF THE INVENTION

The present invention is an apparatus which can be easily connected to a lawn maintenance device for the purpose of aerating, dethatching, and grooming lawn and turf surfaces to achieve desirable health and appearance benefits to the lawn or turf surface. This device requires no power source save the movement of the device against the surfaces that are desired to be affected by the device, it requires no accessory tools for its use, once connected, is adaptable to a wide variety of lawn maintenance devices, and supplies the support that is normally provided by a front roller where used as a replacement for the front roller of a reel-type lawn mower. The device includes a stationary cylindrical shaft of the same length and diameter as the inner shaft of the original front roller, which is intended to be attached to the mower in the same manner as the original front roller; a substantially round driver member having a diameter substantially the same as the original front roller and having a bearing lined aperture will be placed over the shaft member; the driver member is intended to rotate upon the shaft member when in contact with the ground and the lawn mower is in motion; an externally toothed gear of a substantially smaller diameter than the diameter of the driver member is connected to one side of the driver member; a substantially round transfer disc member having an aperture in its center and having a diameter smaller than the diameter of the driver member would be placed upon the shaft member and engaged with the shaft member so as to prevent rotation; the transfer disc would have four (4) relatively small externally toothed gears attached to one side of said transfer disc at equal distances apart; these gears being connected to the transfer disc in a manner which will allow them to rotate freely and being positioned upon the transfer disc so that the teeth on all four gears will mesh simultaneously with the gear teeth of the gear which is connected to the driver member; a substantially round groomer gear or wheel having external teeth which contact the lawn or turf surface and having an aperture in its center would be placed over the shaft member; the groomer gear has a circular depression lined with gear teeth configured to contact and mesh with the gear teeth on the four transfer disc gears simultaneously. The groomer gear is kept in contact with the transfer disc gears through the use of a retaining clip or other methods known in the art. A rotation of the driver member from contact with a moving ground surface would cause a rotation of the transfer disc gears, thereby causing an opposite rotation of the groomer gear to that of the driver member, and thereby bringing the external groomer teeth into forceful contact with the lawn or turf surface to provide the desired aerating, dethatching, and grooming actions.

It is an object of the present invention to provide a lawn or turf aerating, dethatching, and grooming apparatus which would be readily adaptable to a wide variety of past, present, and future lawn maintenance devices.

It is another object of the invention to provide a lawn or turf aerating, dethatching, and grooming apparatus which requires no external power source for its operation save its being moved against a surface that is desired to be affected by the invention.

An additional object of the invention is to provide a lawn or turf aerating, dethatching, and grooming apparatus which has a minimum of components and is therefore of an uncomplicated design which would simplify manufacturing, and repair of the invention.

A final object of this invention is to provide a lawn or turf aerating, dethatching, and grooming apparatus which is manufactured of materials which are stable, durable, and inexpensive.

DETAILED DESCRIPTION OF THE PREFERRED EMBODIMENT

Figure 1:
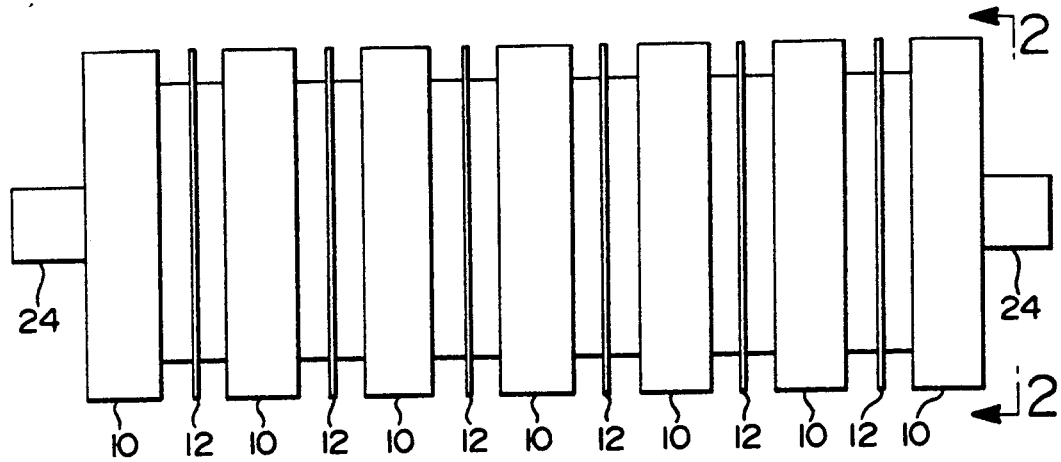
FIG. 1 is a side view of a plurality of the invention in a potential embodiment.

FIG. 1 shows a plurality of the invention 20 as utilized in a preferred embodiment. The driver 10 is engaged with the shaft 24 thereby concealing the retaining clip 30 not shown. The groomer gear 12 is operably engaged with the transfer disc gears 16 not shown, thereby concealing the transfer disc 32 not shown, the transfer disc gears 16 not shown, the driver gear 18 not shown, the bearing 22 not shown, and the shaft 24. The driver 10 is in contact with the groomer gear 12 and a multiplicity of alternating drivers 10 and groomer gears 12 units would be placed in side-to-side contact with one another as many times as desired for a particular application.

Figure 2:
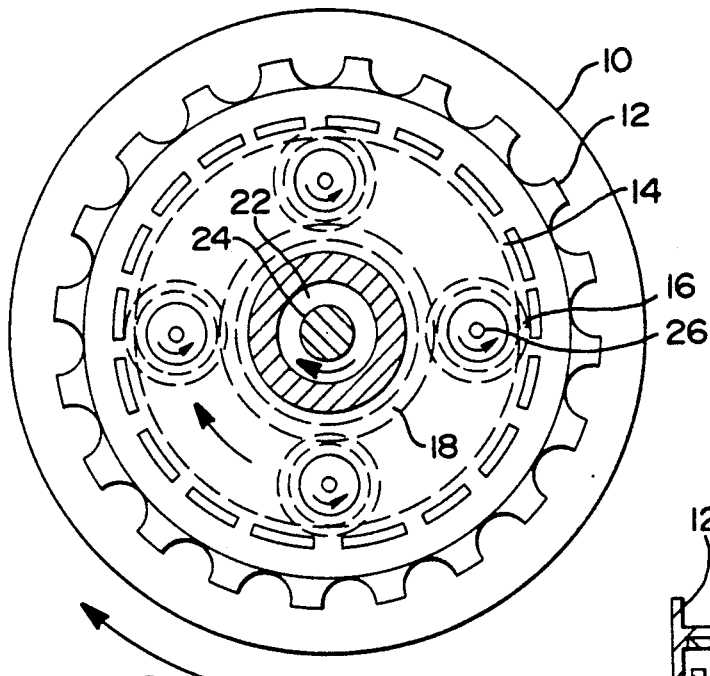
FIG. 2 is a fragmentary end view showing the positioning of the components of the invention.

FIG. 2 is an end view of the groomer gear 12, the inner groomer gear teeth 14, the transfer disc gears 16, the driver 10, the driver gear 18, the bearing 22, and the shaft 24 in operable engagement as intended are shown. As can be seen from the drawing and as indicated by the arrows, a rotation of the driver 10 and the driver gear 18 will cause a counter-rotational movement of the transfer disc gears 16 and the groomer gear 12. It is intended and anticipated that a movement of the driver 10 against a lawn or turf surface, not shown, would cause the rotational movement. It can further be seen in this view that all components of the invention 20 except for the locking means 28 not shown, are substantially round.

Figure 3:
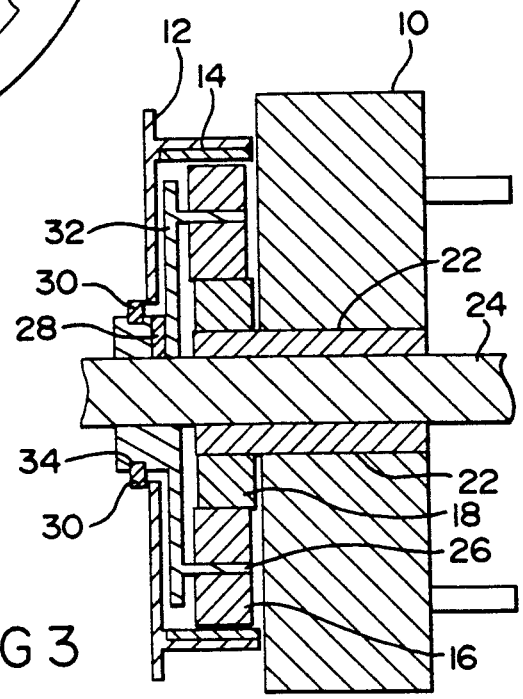
FIG. 3 is a cross-sectional side view of the invention.

FIG. 3 shows the bearing 22 inserted into the aperture defined by the driver 10 and into the aperture defined by the driver gear 18. The shaft 24 is disposed within the aperture defined by the transfer disc 32 and the aperture defined by the bearing 22. The locking means 28 are in contact with the shaft 24 the locking means 28 being any common in the art, e.g., screws or drive pins. The transfer disc gears 16 are connected to the transfer disc 32 by the connecting means 26 which are any connecting means common in the art, e.g., screws, pins, or rivets. The transfer disc gears 16 are in mesh with the driver gear 18. The transfer disc gears 16 are also in mesh with the inner groomer gear teeth 14. The transferred disc 32 is disposed within the aperture defined by the groomer gear 12. The retaining clip 30 is disposed within the groove 34 in the transfer disc 32.

The foregoing description of the preferred embodiment is not meant to limit the scope of the claimed invention which may be practiced in a variety of embodiments. Further, the claimed invention will best be understood from a reading of the appended claims.

I claim:

1. An apparatus for grooming and dethatching lawn or turf surfaces, comprising, in combination;
   (a) a driver;
   (b) a bearing operably engaged with the driver;
   (c) a first gear operably engaged with the driver;
   (d) a shaft operably engaged with the bearing;
   (e) at least two second gears operably engaged with the first gear;
   (f) a transfer disc operably engaged with the second gears;
   (g) first means for operably engaging the transfer disc with the second gears;
   (h) second means for operably engaging the transfer disc with the shaft;
   (i) a groomer gear operably engaged with the second gears; and
   (j) a retaining clip operably engaged with the transfer disc and a groomer gear.

2. The apparatus of claim 1, wherein:
   (a) said driver is substantially cylindrical;
   (b) said driver defines an aperture;
   (c) said driver defines a substantially round depression upon one side of driver; and
   (d) said bearing is configured to be disposed within the aperture defined by the driver.

3. The apparatus of claim 2, wherein:
   (a) said shaft member is substantially cylindrical;
   (b) said bearing defines an aperture in which the shaft can be disposed; and
   (c) said first gear defines an aperture in which the bearing can be disposed.

4. The apparatus of claim 3, wherein:
   (a) said transfer disc defines an aperture in which the shaft can be disposed;
   (b) said first means allows rotation of the second gears relative to the transfer disc;
   (c) said transfer disc has a groove defined upon its surface in which the retaining clip can be disposed; and
   (d) said second means prevents rotation of the transfer disc upon the shaft.

5. The apparatus of claim 4, wherein:
   (a) said groomer gear defines an aperture in which the shaft and the transfer disc are operable;
   (b) said groomer gear defines a depression which has gear teeth upon its inner surface configured to mesh with the second gears;
   (c) said second gears are configured to mesh with the first gear; and
   (d) said second gears are positioned upon the transfer disc to allow meshing with the first gear while simultaneously meshing with the gear teeth within the depression which is defined upon the groomer gear.

6. The apparatus of claim 5, wherein:
   (a) said groomer gear is substantially cylindrical; and
   (b) said groomer gear has depressions defined upon its exterior diameter.

7. The apparatus of claim 6, further including:
   (a) third means for aerating, dethatching, grooming, lifting, and cutting lawn or turf grasses; and
   (b) wherein the depressions upon the groomer gear exterior constitute the third means.

* * * * *